United States Patent
Minarik et al.

(10) Patent No.: US 9,571,908 B2
(45) Date of Patent: Feb. 14, 2017

(54) EXTENDABLE SYNCHRONOUS LOW POWER TELEMETRY SYSTEM FOR DISTRIBUTED SENSORS

(71) Applicant: Raytheon Company, Waltham, MA (US)

(72) Inventors: Daniel B. Minarik, North Kingstown, RI (US); Mark S. Langelier, Harrisville, RI (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/582,155

(22) Filed: Dec. 23, 2014

(65) Prior Publication Data
US 2016/0182981 A1 Jun. 23, 2016

(51) Int. Cl.
| | |
|---|---|
| H04Q 9/04 | (2006.01) |
| H04B 3/36 | (2006.01) |
| H04L 29/08 | (2006.01) |
| H04L 5/14 | (2006.01) |
| H04L 7/04 | (2006.01) |

(Continued)

(52) U.S. Cl.
CPC .............. *H04Q 9/04* (2013.01); *H04B 3/36* (2013.01); *H04L 5/14* (2013.01); *H04L 7/044* (2013.01); *H04L 25/38* (2013.01); *H04L 67/12* (2013.01); *H04Q 9/00* (2013.01)

(58) Field of Classification Search
USPC ............... 375/211, 214, 215, 219, 222, 220, 375/240.26–240.28, 285, 284, 278, 293, 375/295, 316, 324, 346, 340, 354–376
See application file for complete search history.

(56) References Cited

U.S. PATENT DOCUMENTS

| | | | |
|---|---|---|---|
| 4,023,140 A | * 5/1977 | Siems | G01V 1/22 340/870.13 |
| 5,287,353 A | 2/1994 | Buda et al. | |

(Continued)

FOREIGN PATENT DOCUMENTS

| | | |
|---|---|---|
| EP | 1 014 273 A2 | 6/2000 |
| WO | WO 2009/013008 A2 | 1/2009 |

OTHER PUBLICATIONS

Written Opinion of the International Searching Authority for International Application No. PCT/US2015/067221 filed Dec. 21, 2015, Written Opinion of the International Searching Authority mailed Mar. 24, 2016 (7 pgs).

(Continued)

*Primary Examiner* — Linda Wong
(74) *Attorney, Agent, or Firm* — Lewis Roca Rothgerber Christie LLP

(57) ABSTRACT a bidirectional repeater for repeating an electrical signal traversing a conductive line coupled between a gateway node and a sensor, the bidirectional repeater comprising a first input-output port coupled to the gateway node, a second input-output port coupled to the sensor, a first transceiver configured to receive a synchronization signal from the first input-output port and to transmit a resynchronized data signal to the first input-output port, a second transceiver configured to transmit the synchronization signal to the second input-output port and to receive a data signal from the second input-output port, and a repeater circuit coupled to the first and second transceivers and configured to pass through the synchronization signal, and to resynchronize the data signal to generate the resynchronized data signal.

20 Claims, 7 Drawing Sheets

(51) Int. Cl.
*H04L 25/38* (2006.01)
*H04Q 9/00* (2006.01)

(56) References Cited

U.S. PATENT DOCUMENTS

| | | | |
|---|---|---|---|
| 5,363,367 | A | 11/1994 | Kobayashi et al. |
| 6,437,601 | B1* | 8/2002 | Borkar et al. .................. 326/93 |
| 7,031,221 | B2* | 4/2006 | Mooney ................... G11C 7/10 365/194 |
| 2002/0126574 | A1* | 9/2002 | Downey et al. ................ 367/14 |
| 2013/0156016 | A1* | 6/2013 | Debnath ........... H04W 72/0406 370/336 |
| 2014/0016617 | A1* | 1/2014 | Froberg Olsson .... H04W 36/00 370/331 |
| 2014/0213311 | A1* | 7/2014 | Courtice ....................... 455/508 |
| 2015/0077245 | A1* | 3/2015 | Kaufman et al. ........ 340/539.12 |
| 2015/0346366 | A1* | 12/2015 | Mellier .................. G01V 1/201 367/15 |

OTHER PUBLICATIONS

International Search Report for International Application No. PCT/US2015/067221, filed Dec. 21, 2015, International Search Report dated Mar. 16, 2016 and mailed Mar. 24, 2016 (5 pgs).

\* cited by examiner

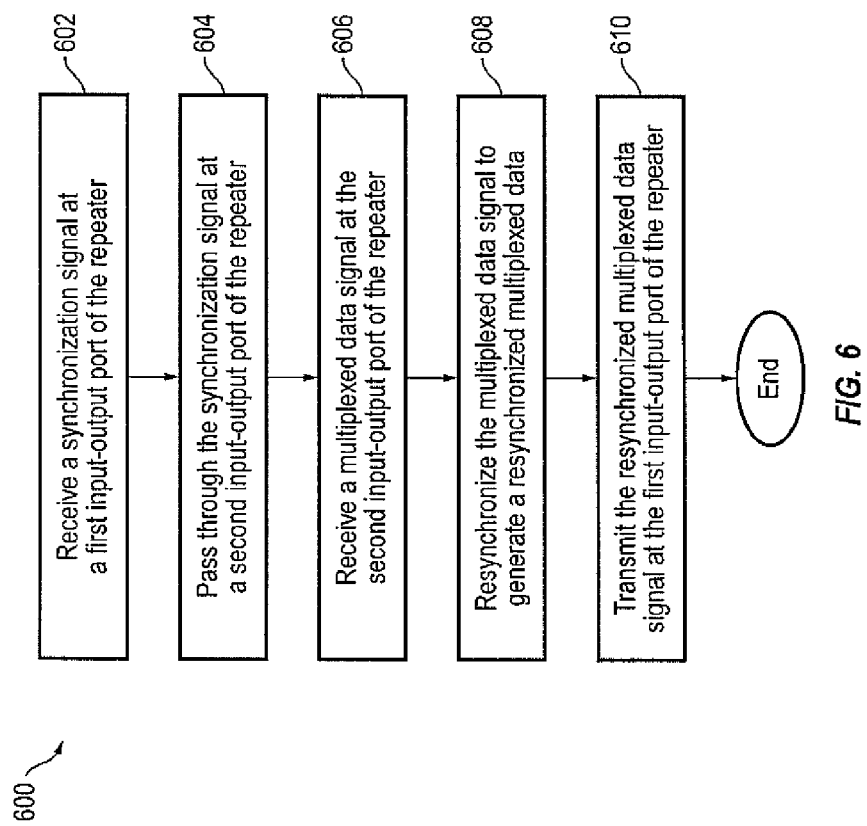

EXTENDABLE SYNCHRONOUS LOW POWER TELEMETRY SYSTEM FOR DISTRIBUTED SENSORS

FIELD

Embodiments of the invention relate to telemetry systems, and more particularly, to an extendable synchronous telemetry system having distributed sensors.

BACKGROUND

Distributed sensor networks use a set of spatially scattered sensors designed to obtain measurements from the environment. A central node connected to the sensors collects the data, which is used to extract relevant information about the environment.

Conventional network types, such as the RS-485 network, allow the implementation of linear bus topologies (e.g., in-line serial drop communication links). However, such networks have bandwidth/data rate limitations that constrain the quantity of and the physical spacing between sensors employed. Data rates (baud rates) are typically governed by cable length and physical signaling protocols. Electrical cables have an inherent low-pass filtration characteristic (due to intrinsic inductance, resistance, and capacitance), which leads to lower data rates for longer spans of the electrical cable. Data protocols attempt to optimize signal integrity and may limit the bit error rate for a given design parameter. Extending length and number of distributed sensors may require additional busses or cables running at slower baud rates. Manufacturability may become increasingly more expensive as additional cables are added to accommodate sensor bandwidth, which can lead to solutions that may not be realistic in terms of cost.

Some semiconductor manufacturers have developed RS-485 transceiver devices with built-in cable equalization (e.g., high-frequency gain circuits) that extends the range of an RS-485 network. While these devices may succeed in lengthening the range of such networks, they still have a limit to their maximum range. Further, these devices do not attempt to address the concept of synchronization.

Other network types such as Ethernet and USB have existing methods for extending their range; however, these methods often impose high power consumption, cost, and even size making them unsuitable for many applications, such as long-distance sub-sea surveillance.

What is desired is an extendable synchronous low power telemetry system for distributed sensor networks that is low cost, reliable, and readily scalable.

SUMMARY

Aspects of embodiments of the invention are directed toward a method for connecting a large number of distributed synchronized sensors and a telemetry system implementing the same. Aspects of embodiments of the invention permit the product of data transmission length multiplied by bandwidth to be extended to significantly higher values than previously attainable while maintaining precise timing synchronization between sensors. Thus, embodiments of the present invention allow both the physical spacing and quantity of sensors to be extended beyond the typical limits of standard distributed sensor networks (DSNs) and to be arbitrarily scalable.

Aspects of embodiments of the invention are directed toward a low power, low cost telemetry system architecture that couples multiple distributed sensors to a common node using off-the-shelf transceiver devices. The system comprises a gateway node, a multi-wire cable, one or more repeaters, and a common digital interface on each sensor. Sensors are placed along the cable and receive the synchronization signal which allows them to sample their measurements simultaneously. The sensors then transmit their data samples to the gateway node using time division multiplexing (TDM). The Repeaters capture and retransmit the uplink data samples to the gateway node.

According to an embodiment of the invention, there is provided a bidirectional repeater for repeating an electrical signal traversing a conductive line coupled between a gateway node and a sensor, the bidirectional repeater comprising: a first input-output port coupled to the gateway node; a second input-output port coupled to the sensor; a first transceiver configured to receive a synchronization signal from the first input-output port and to transmit a resynchronized data signal to the first input-output port; a second transceiver configured to transmit the synchronization signal to the second input-output port and to receive a data signal from the second input-output port; and a repeater circuit coupled to the first and second transceivers and configured to pass through the synchronization signal, and to resynchronize the data signal to generate the resynchronized data signal.

In an embodiment, the repeater circuit comprises a timing control circuit that is configured to lock into a phase of the synchronization signal.

In an embodiment, the repeater circuit is configured to resynchronize the data signal by re-clocking and regenerating the data signal.

In an embodiment, re-clocking the data signal comprises shifting the data signal in time to start at a beginning of a next time slot.

In an embodiment, the data signal comprises a serial, bidirectional, time division multiplexed data and is divided into a number of frames, each frame having a plurality of time slots.

In an embodiment, a time slot of the plurality of time slots comprises a data bit.

In an embodiment, regenerating the data signal comprises recreating the data bit to correct for noise and signal distortion.

In an embodiment, the synchronization signal comprises a single pulse.

In an embodiment, the repeater circuit is configured to pass through the synchronization signal without regenerating the synchronization signal.

In an embodiment, the repeater circuit is further configured to lock into a phase of the synchronization signal.

In an embodiment, the repeater is coupled to a plurality of sensors comprising the sensor, wherein the first input-output port is coupled to the gateway node through one or more sensors of the plurality of sensors.

According to an embodiment of the invention, there is provided a synchronous telemetry system comprising: a cable comprising one or more conductive elements for conducting a synchronization signal; a gateway node configured to supply the synchronization signal, and to receive a resynchronized data signal; a repeater coupled to the cable, and configured to pass through the synchronization signal; a sensor coupled to the cable and configured to receive a synchronization signal, to measure a parameter in response to receiving a synchronization signal and to generate a data signal corresponding to the measured parameter; and wherein the repeater is coupled between the gateway node and the sensor, and is further configured to re-clock and reconstruct the data signal to generate the resynchronized data signal.

In an embodiment, the one or more conductive elements comprise a pair of wires, and wherein the synchronization signal, the data signal, and the resynchronized data signal are differential signals transmitted over the pair of wires.

In an embodiment, the gateway node is further configured to supply electrical power to the sensor and repeater through the cable.

In an embodiment, the each of the sensor and repeater comprise a local power source.

In an embodiment, the synchronous telemetry system comprises a plurality of segments coupled in series, each segment comprising a plurality of sensors comprising the sensor and one or more repeaters comprising the repeater.

In an embodiment, the plurality of sensors concurrently measure parameters in response to receiving a synchronization signal.

In an embodiment, the sensor comprises at least one of an acoustic sensor, optical sensor, temperature sensor, and vibration sensor.

According to an embodiment of the invention, there is provided a method of repeating an electrical signal traversing a conductive line coupled between a gateway node and a sensor, the method comprising: receive, by a repeater, a synchronization signal at a first input-output port of the repeater; pass through, by the repeater, the synchronization signal at a second input-output port of the repeater; receive, by the repeater, a data signal at the second input-output port of the repeater; resynchronize, by the repeater, the data signal to generate a resynchronized data signal; and transmit, by the repeater, the resynchronized data signal at the first input-output port of the repeater.

In an embodiment, the method further comprises locking, by the repeater, into a phase of the synchronization signal.

BRIEF DESCRIPTION OF THE DRAWINGS

These and other features and advantages of the invention will be better understood by reference to the following detailed description when considered in conjunction with the following drawings, in which like elements are referenced with like numerals. These drawings should not be construed as limiting the invention, but are intended to be illustrative only.

FIG. 6 is a block diagram of a process of repeating signals received by the repeater, according to an illustrative embodiment of the present invention.

DETAILED DESCRIPTION

The detailed description set forth below in connection with the appended drawings is intended as a description of illustrative embodiments of a system and method for repeating signals in a distributed sensor network (DSN) and a synchronous telemetry system using the same in accordance with the invention, and is not intended to represent the only forms in which the invention may be implemented or utilized. The description sets forth the features of the invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features. The terms "substantially," "about," and similar terms are used as terms of approximation and not as terms of degree, and are intended to account for the inherent deviations in measured or calculated values that would be recognized by those of ordinary skill in the art. Furthermore, when a component is referred to as being "coupled" to or "connected" to another component, it can be directly attached to the other component or intervening components may be present therebetween.

Some embodiments of the invention are directed toward a low power, low cost synchronous telemetry system architecture that couples multiple distributed sensors to a gateway node (e.g., central node) using off-the-shelf transceiver devices (e.g., RS-485 transceiver devices such as the 8-pin RS-485 transceiver integrated chip). In an embodiment, the system comprises a gateway node, a cable (e.g., a multi-wire cable such as a 4-wire cable), one or more repeaters, and one or more sensors having a common digital interface. Sensors may be placed along the cable and receive a synchronization signal, which allows them to sample their measurements simultaneously. The node, one or more repeaters, and the one or more sensors are coupled together (e.g., electrically connected in series) through the cable. In an embodiment, the downlink synchronization signal is passed down the cable through one or more repeaters to the one or more sensors. The one or more sensors then may transmit their data samples to the gateway node using time division multiplexing (TDM). The one or more repeaters capture and retransmit the uplink data samples to the gateway node.

Embodiments of the present invention permit the cable length-bandwidth product to be extended to significantly higher values than previously attainable while maintaining precise timing synchronization between sensors. For example, when the cable length reaches the physical limit for a given segment of an in-line serial drop communication link, integration of a repeater allows another segment to be added. Repeaters may be added to extend the distance to any arbitrary length.

Figure 1A:
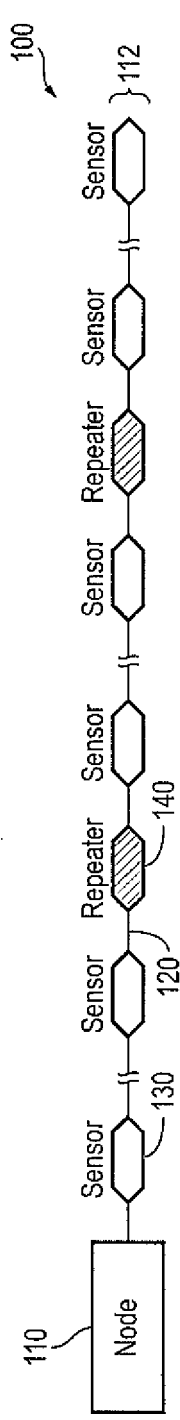
FIG. 1A is a block diagram of a synchronous telemetry system utilizing a repeater 140, according to an illustrative embodiment of the present invention.

FIG. 1A is a block diagram of a synchronous telemetry system 100 utilizing a repeater 140, according to an illustrative embodiment of the present invention.

According to an embodiment of the present invention, the synchronous telemetry system 100 includes a gateway node (e.g., a central node or a sink node) 110 and a plurality of field nodes coupled together (e.g., electrically connected to one another) via a cable 120. The field sensors include a plurality of sensors 130 and one or more repeaters (e.g., bidirectional repeaters) 140, which may be distributed along the length of the cable 120 at regular or irregular intervals. The sensors 130 measure one or more parameters of interest in the environment and may be any combination of acoustic sensors, optical sensors, temperature sensors, vibration sensors, and/or the like. The sensor measurements are synchronized by way of a synchronization signal (e.g., downlink synchronization signal) provided by the gateway node 110 and carried by a telemetry bus of the cable 120 to each of the sensors 130. Upon making a measurement, sensors 130 write their data samples to a data signal (e.g., an uplink data signal or multiplexed data signal) using time division multiplexing (TDM), which is transmitted back to the gateway node 110. The synchronization signal and the data signal may be carried by the same telemetry bus of the cable 120. The telemetry bus may be a single electrical conductor (e.g., single wire), or may be a differential balanced line having two electrical conductors (as in a twisted pair cable), which may offer improved signal to noise ratio as compared to a single conductor line.

In an embodiment, the one or more repeaters 140 receive both the synchronization signal and the data signal (e.g., the multiplexed data signal), and regenerate one or more of the signals to correct for distortions (e.g., attenuation as a result of traversing the cable 120) and improve their signal to noise ratio (SNR), and retransmit the signals down or up the telemetry bus of the cable 120. As such, for a given bit rate, a series of sensors (comprising a segment) may be extended as far as allowed by the signaling protocol, and a repeater 140 may be used to serially couple the series of sensors to a further segment. In this manner, an arbitrary number of segments may be serially coupled together to form a chain 112 of an arbitrary length.

In an embodiment, the gateway node 110 provides electrical power to the field nodes through a power bus line of the cable 120. The power bus line may include two electrical conductors for carrying a power signal and a reference (e.g., ground) signal. In an embodiment, some or all of the field nodes may each have a local power source (such as a battery) to power the corresponding node. The local power sources may be operated in tandem with, or in lieu of, a central power source at the gateway node 110. Thus, in some embodiments, the local power source line may obviate the need for a power bus line at the cable 120.

Figure 1B:
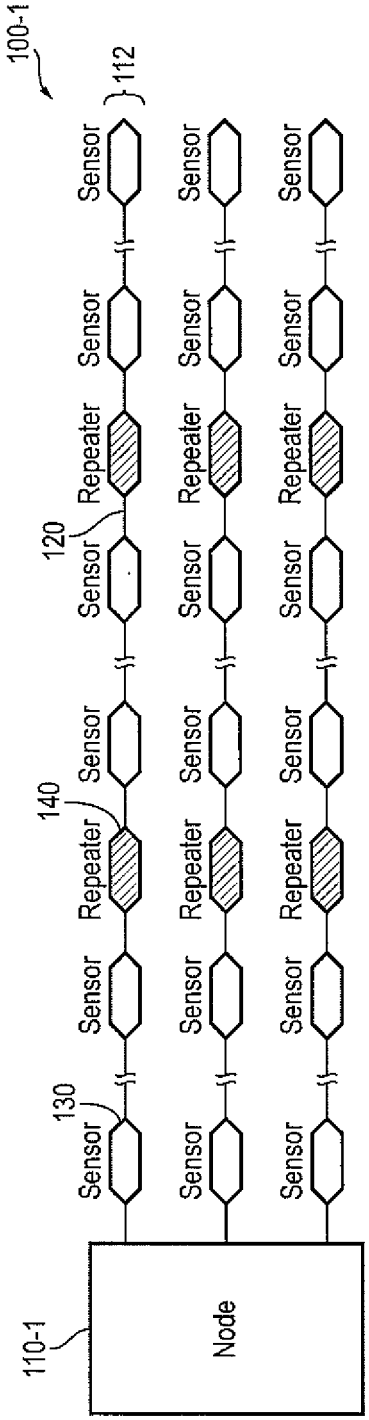
FIG. 1B is a block diagram of a synchronous telemetry system utilizing a repeater, according to an illustrative embodiment of the present invention.

FIG. 1B is a block diagram of a synchronous telemetry system 100-1 utilizing a repeater 120, according to an illustrative embodiment of the present invention.

The synchronous telemetry system 100-1 utilizes a multi-chain, parallel, in-line distributed sensor architecture (also referred to as a star topology). Each chain 112 may be substantially similar to that of the synchronous telemetry system 100 of FIG. 1A.

According to an embodiment, one or more gateway nodes 110 and/or 110-1 may be coupled together to form a telemetry system having a mesh topology.

While many of the examples and embodiments described herein may refer to the telemetry system 100 and/or the gateway node 110, the concepts described are not topology specific and may be equally applicable to, for example, the telemetry system 100-1 and/or the gateway node 110-1.

Figure 2A:
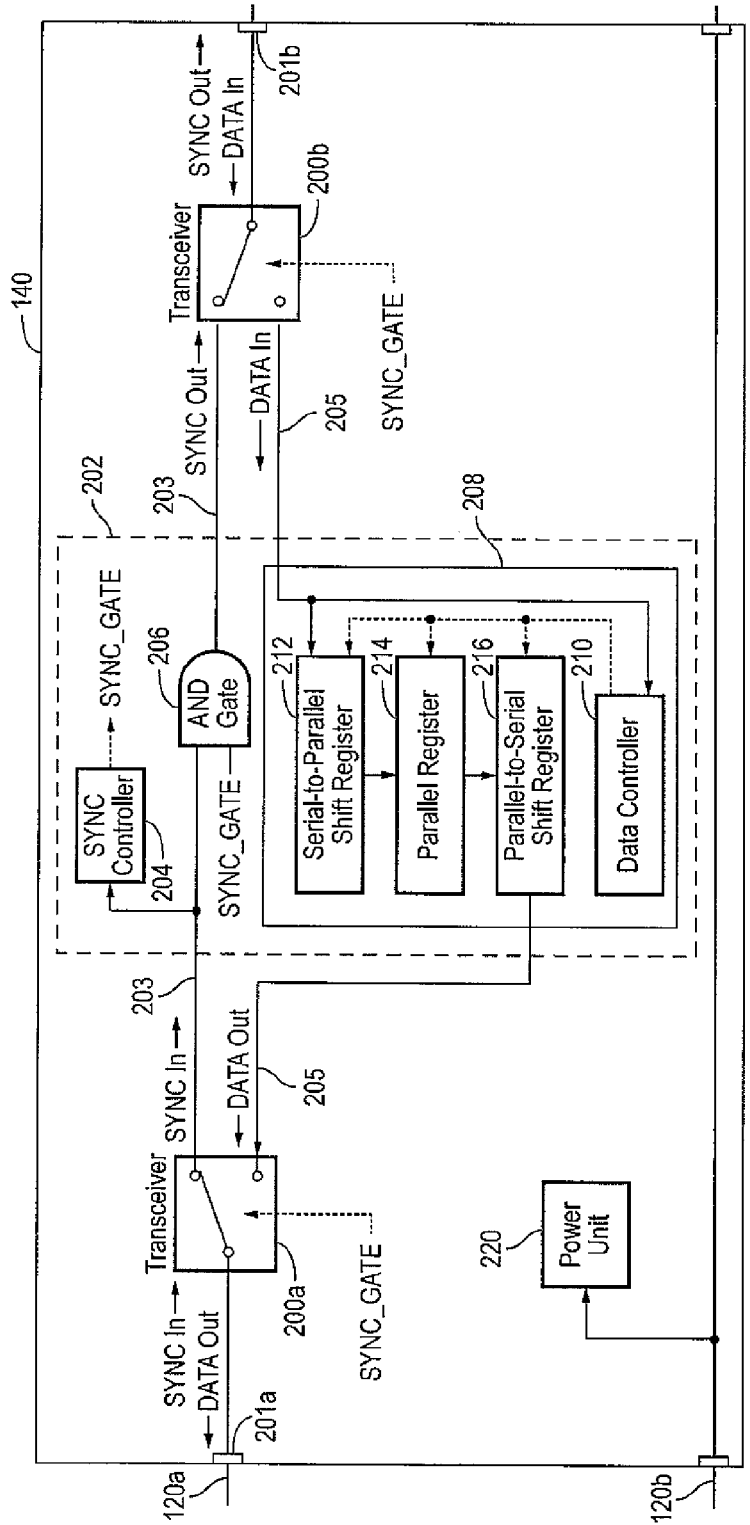
FIG. 2A is a schematic diagram of a repeater, according to an illustrative embodiment of the present invention.
Figure 2B:
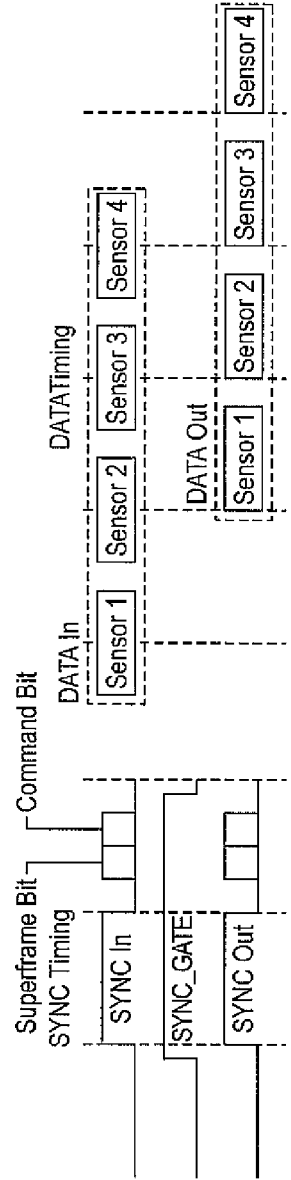
FIG. 2B is a timing diagram showing the effect of the operation of the repeater on a signal carried by the cable, according to an embodiment of the present invention.

FIG. 2A is a schematic diagram of a repeater 140, according to an illustrative embodiment of the present invention. FIG. 2B is a timing diagram showing the effect of the operation of the repeater 140 on the signal carried by the cable 120, according to an embodiment of the present invention.

According to an embodiment, the repeater (e.g., the bidirectional repeater) 140 includes first and second transceivers (e.g., bidirectional transceivers) 200a and 200b for receiving and transmitting the downlink and uplink signals (e.g., the downlink synchronization signal and the uplink data signal), and a repeater circuit 202 for repeating the downlink and uplink signals received by the transceivers 200a/b. In an embodiment, the repeater circuit 202 includes a synchronization controller 204 for locking into the periodicity of the synchronization signal, a pass-through gate 206, and a data regenerator 208.

In an embodiment, each of the transceivers 200a/b may function as a switch (e.g., a three-way switch) configured to couple (e.g., electrically couple or electrically connect) the cable telemetry bus 120a to either of the downlink line 203 or the uplink line 205. The first transceiver 200a may be coupled to the cable telemetry bus 120a via the first port (e.g., the first input-output port) 201a, and the second transceiver 200b may be coupled to the cable telemetry bus 120a via the second port (e.g., the second input-output port) 201b. In an example, the transceivers 200a/b couple the cable telemetry bus 120a to the downlink line 203 when a control signal (e.g., a timing signal SYNC_GATE) is at a logical high, and couple the cable telemetry bus 120a to the uplink line 205 when the control signal (e.g., the timing signal SYNC_GATE) is at a logical low.

The synchronization controller 204 is configured to generate the timing signal SYNG GATE that matches the periodicity and phase of the synchronization signal SYNC_IN. In so doing, the repeater 140 may utilize a phase lock loop (PLL) having a phase detector and a voltage control oscillator (VCO). At initial power on, the timing signal SYNC_GATE may be at a logic high, thus coupling the cable telemetry bus 120a to the downlink line 203 and allowing synchronization signal SYNC_IN to reach the synchronization controller 204. After one or more cycles of the synchronization signal SYNCIN, the synchronization controller 204 may lock onto (i.e., "learn" the periodicity and phase of) the synchronization signal SYNC_IN and generate the timing signal SYNC_GATE (shown in FIG. 2B), which may be slightly wider than the synchronization signal SYNC_IN. The wider width may be desired to accommodate for any nominal delays at the synchronization pass-through gate 206. In an example, this additional width may be a few nanoseconds (ns) to a few microseconds (μs) long. In an embodiment, the width of the timing signal SYNC_GATE extends beyond the synchronization signal SYNC_IN to cover a superframe bit and a command bit (discussed in greater detail below with reference to FIGS. 3A and 3B).

In an embodiment, the repeater 140 passes the synchronization signal SYNC_IN through without any regeneration (e.g., without any distortion), in order to reduce (e.g., minimize) delays in the downlink transmission of synchronization signal and to improve synchronicity of the telemetry system 100. In an embodiment, the repeater 140 also passes the superframe bit and the command bit through without any regeneration. As such, the pass-through gate 206 performs a logical AND operation on the signal on the downlink line 203 (which may include a synchronization pulse and sensor data) and the timing signal SYNC_GATE, ensuring that only the synchronization pulse is passed-through and outputted from the repeater 140 at the second port 201b.

The data regenerator 208 resynchronizes, i.e., re-clocks and regenerates, the data signal (which is in the form of one or more multiplexed data blocks) from the sensors 130 that follow the repeater 140 down the chain 112. When the timing signal SYNC_GATE is low, the transceivers 200a/b couple the cable telemetry bus 120a to the uplink line 205 allowing the data regenerator 208 to receive sensor data blocks DATA_IN from sensors 130. The data regenerator 208 may include two or more shift registers and a data controller 210 for controlling the operation of the shift registers. In an embodiment, the data regenerator 208 includes a first shift register (e.g., a serial-to-parallel or serial-in/parallel-out shift register) 212, a second shift register (e.g., a parallel-to-parallel shift register) 214, and a third shift register (e.g., a parallel-to-serial or parallel-in/serial-out shift register) 216. The data controller 210 may provide a clock signal matching the bitrate of the sensor data blocks DATA_IN. The clock signal may have a frequency that is the multiple of the frequency detected for the synchronization signal SYNC_IN (or timing signal SYNC_GATE). The first shift register 212 clocks in the data bits from the sensor data blocks DATA_IN one bit at a time, the second shift register 214 copies all of the bits of the sensor data blocks DATA_IN at the same time, and the third shift register 216 sends out the bits one bit at a time, which together form the repeated data block DATA_OUT. The data controller 210 controls the timing of the operation of the shift registers such that the repeated data block DATA_OUT is aligned with the synchronization signal SYNC_IN (or the timing signal SYNC_GATE). (Alignment will be discussed in greater detail in the description of FIGS. 3A-4B). In shifting the data bits, the shift registers (e.g., shift registers 212, 214, and 216) also recreate the bits, thus correcting any distortions that the data bits may have experienced as a result of noise or cable transmission characteristics. As such, the repeated data block DATA_OUT may be a delayed and regenerated version of the sensor data block DATA_IN as shown in FIG. 2B.

The repeater 140 may further include a power unit 220 for providing power to the circuit blocks within the repeater 140. In some embodiments, the power unit 220 may draw power from a cable power bus 120b of the cable 120 (as shown in FIG. 2A) and/or draw upon a local power source (such as a battery).

Figure 3A:
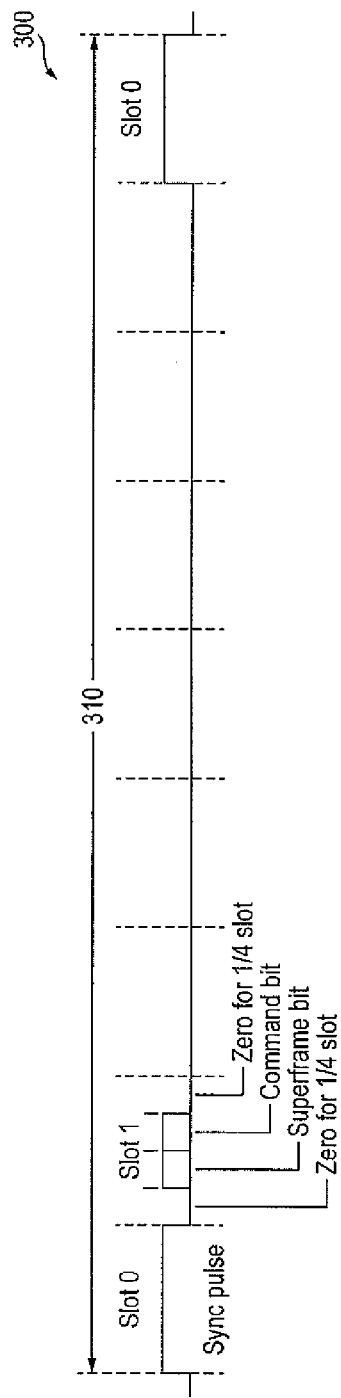
FIG. 3A illustrates the timing diagram of a frame of a downlink synchronization signal transmitted by a gateway node, according to an embodiment of the present invention.
Figure 3B:
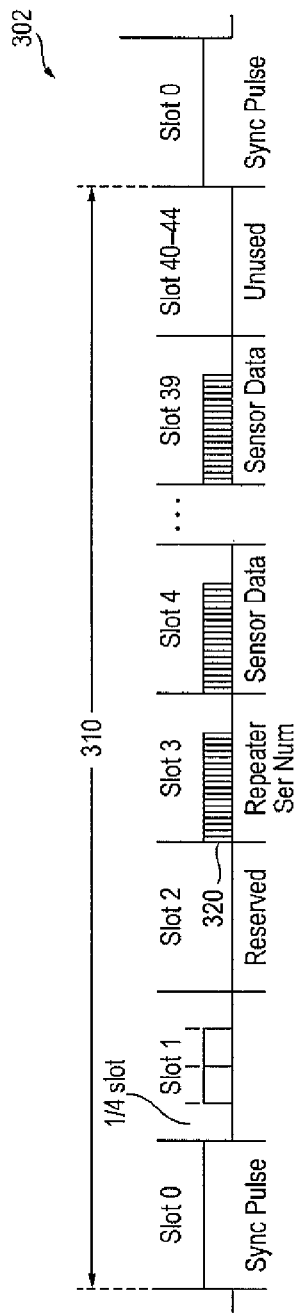
FIG. 3B illustrates a timing diagram of a frame of both the downlink synchronization signal and the uplink data signal received by the gateway node, according to an embodiment of the present invention.
Figure 3C:
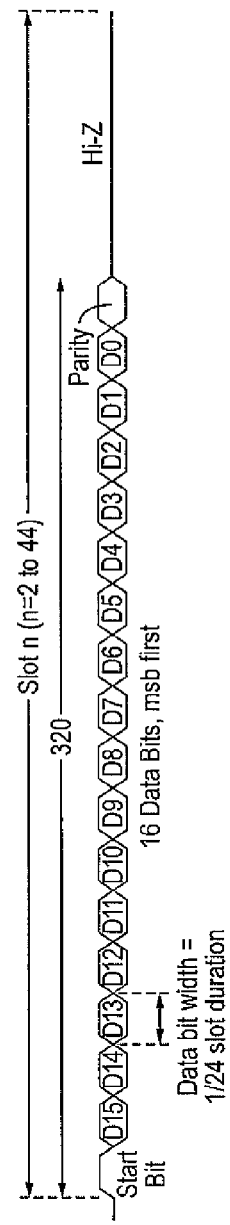
FIG. 3C illustrates a timing diagram of a data sample of the uplink data signal received by the gateway node, according to an embodiment of the present invention.

FIG. 3A illustrates the waveform diagram of a frame 310 of a downlink synchronization signal 300 transmitted by the gateway node 110, according to an illustrative embodiment of the present invention. FIG. 3B illustrates a waveform diagram of a frame 320 of the uplink data signal 302 received by the gateway node 110, according to an illustrative embodiment of the present invention. FIG. 3C illustrates a waveform of a data sample of the uplink data signal 302 received by the gateway node 110, according to an illustrative embodiment of the present invention.

According to an embodiment, the waveform of the signal (e.g., a downstream synchronization signal 300 or uplink data signal 302) carried by the telemetry system 100 may be divided into a number of frames (e.g., time frames) 310, which may be subdivided into a plurality of slots (e.g., time slots). In the examples illustrated in FIGS. 3A-3B, a frame 310 includes 45 equal slots (Slots 0-44), a first of which contains a synchronization pulse (e.g., SYNC Pulse at Slot 0). A second slot (Slot 1) may be partially occupied by a command bit and a superframe marker. The command bit may be used to transmit a downlink command (e.g., a command from the gateway node 110 to the sensors 130), while the superframe marker may become active (e.g., go high) every preset number of frames (e.g., every 5000 frames) to mark the beginning of a superframe (of, e.g., 5000 frames). The following slot (Slot 2) may, in some examples, be reserved; however, it may also be used as a data slot. In an example, a frame 310 may represent 200 µs of time, and a superframe of 5000 frames may have a duration of about 1 s.

A frame 310 may include a preset number of data slots (e.g., 37 data slots), each of which may contain the data imprint of either the sensor 130 or the repeater 140. Each data slot may occupy a portion of the slot (e.g., ¾ of a slot) to leave sufficient spacing (e.g., ¼ of a slot) between data from adjacent slots. A first data slot (e.g., Slot 3) may carry a repeater serial number, which uniquely identifies the repeater 140 among other repeaters that may be present in the synchronous telemetry system. The serial number may allow each repeater to be uniquely programmed by the gateway node 110 at the time of system initialization. The information programmed into the repeater 140 may include a slot number. The repeater 140 may retransmit all slots up to the programmed number, then turn off its output so that upstream field sensors (e.g., sensors lying between the gateway node 110 and the repeater 140) may take control of the cable telemetry bus 120a. The repeater serial number may be retransmitted by the repeater 140. In an embodiment in which more than one repeater are integrated onto the cable 120, each repeater may shift the serial number of the preceding repeater by two slots, to leave two slots available to insert its own serial number. A frame 310 may also include a preset number of unused slots (e.g., 5 unused slots) to accommodate for delays in the uplink data signal (or return signal) from the sensors 130. Delays in the return signal will be further explained with reference to FIGS. 4A-4B.

As shown in FIG. 3A, when a gateway node 110 transmits a synchronization signal 300, a frame 310 of the signal may only include a synchronization pulse (e.g., Sync Pulse at Slot 0) and a command bit and superframe marker. As the signal is returned, the data slots may be occupied by measurement data (e.g., sensor data or data blocks 320) from the sensors 130, as is shown in the ideal waveform FIG. 3B.

As shown in FIG. 3C, a sensor data (or data block) 320 includes a start bit, a number of data bits (e.g., binary data bits D0-D15), and one or more code bits (e.g. even parity bits) for error detection. In an example, each of the start bit, data bits, and parity bits have a duration of ¹⁄₂₄ of the sensor data occupies ¾ of a data slot. In an embodiment, the signal is in a high impedance state during the unoccupied portion of the data slots (e.g., ¼ of a data slot). In the data signal (e.g., the multiplexed data signal) 302, the arrival of each successive data block is marked by a lull (e.g., a high impedance state) followed by the start bit.

Figure 4A:
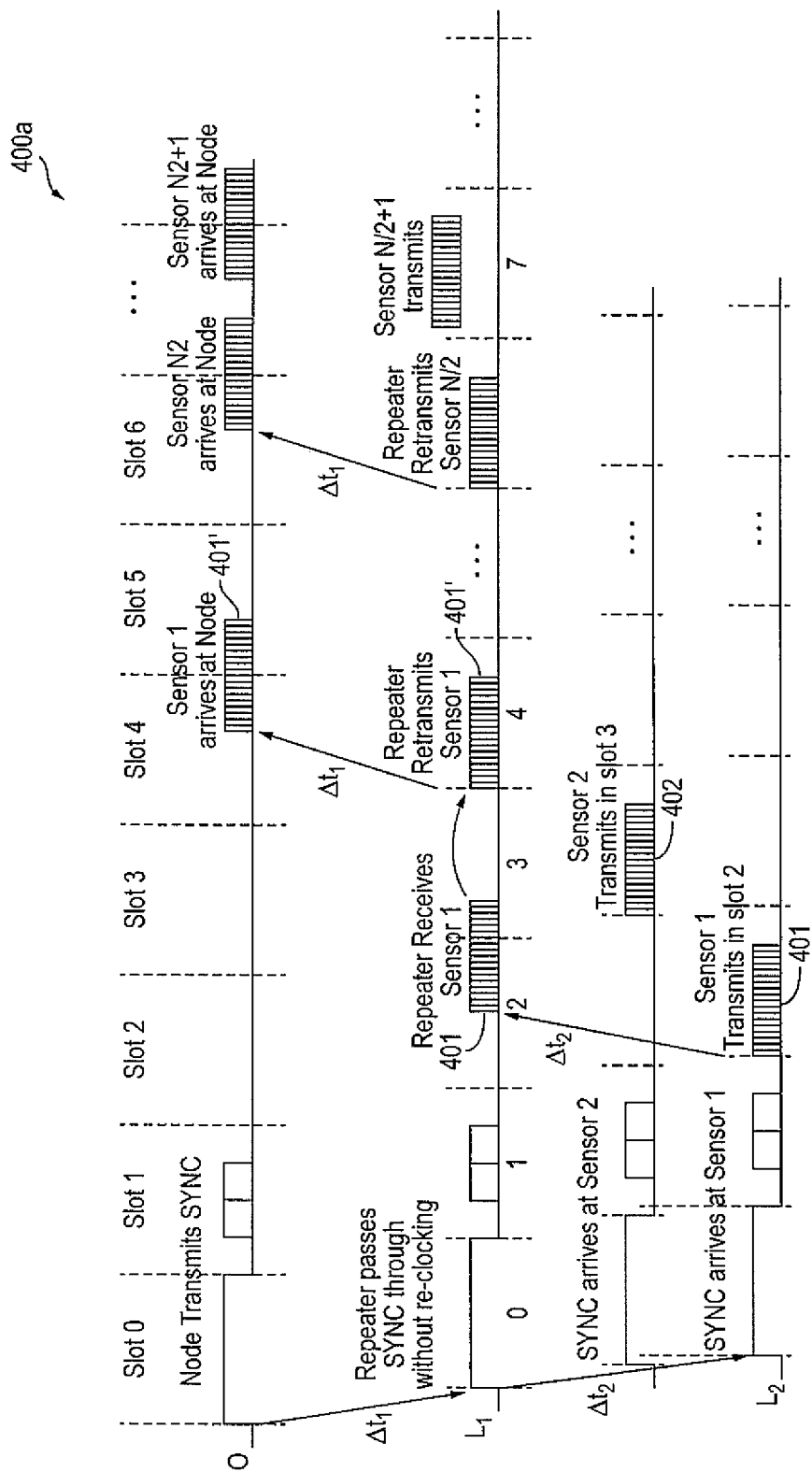
FIG. 4A is a waveform diagram illustrating waveforms of signals received and transmitted by the gateway node, repeater, sensors in a multi-sensor synchronous telemetry system, according to an embodiment of the present invention.

FIG. 4A is a waveform diagram 400a illustrating waveforms of signals received and transmitted by the gateway node 110, sensors 130, and the repeater 140 in a multi-sensor synchronous telemetry system 100, according to an embodiment of the present invention.

For simplicity of illustration, it is assumed here that the synchronous telemetry system 100 includes only a single repeater 140 and N sensors (N being an even integer greater than 3) half of which appear before the repeater 140; however, embodiments of the present invention are not limited thereto and the operations described herein are equally applicable to a telemetry system including any (non-zero) number of repeaters 140 and sensors 130.

Here, the sensor 130 furthest away from the gateway node 110 is labeled as Sensor 1 as it is the first sensor 130 in the chain of N sensors 130 to transmit data back to the gateway node 110 despite the fact that it is the last sensor in the chain to receive the synchronization signal. In the same manner, the closest sensor 130 to the gateway node 110 is labeled as Sensor N as it is the last in a chain of N sensors 130 to transmit data back to the gateway node 110. For simplicity of illustration, it is assumed that the repeater 140 and Sensor 1 are located at distances $L_1$ and $L_2$, respectively from the gateway node 110 (where $L_2$ is greater than $L_1$).

The gateway node 110 generates and transmits a synchronization signal to the field nodes (e.g., sensors 130 and repeater 140) through the cable 120. The synchronization signal arrives at the repeater 140 with a delay of $\Delta t_1$ corresponding to the length $L_1$. In an embodiment, the repeater 140 passes the synchronization signal (e.g., SYNC pulse) through without re-clocking for transmission to the sensors 130 down the line. In an embodiment, the repeater 140 also passes the superframe bit and the command bit through without any re-clocking. The signal is further delayed as it arrives at Sensor 2 and then Sensor 1. Sensor 1 receives the repeated synchronization signal with a further delay of $\Delta t_2$ corresponding to the length $L_2$-$L_1$. In an example in which $L_1$ and $L_2$ are about 250 m and about 500 m, respectively, $\Delta t_1$ and $\Delta t_2$ may equal about 1.25 µs.

In an embodiment, each of the Sensors 1-N performs its measurements when it detects the SYNC pulse of the synchronization signal. However, the Sensors 1-N are configured to (e.g., preprogrammed to) transmit their data signals encapsulating the collected data (which appears in the form of data blocks) during preset data slots in a staggered manner (also referred to as time-division multiplexing). For example, Sensor 1 may transmit during what it perceives as Slot 2, Sensor 2 may transmit during its perceived Slot 3, and so forth. However, due to signal transmission delays, when each of the transmitted data blocks reaches the repeater 140, it may be misaligned (e.g., not line up with) the data slots as perceived by the repeater 140. For example, as illustrated in FIG. 4A, the data signal (e.g., data block) 401 from Sensor 1 may occupy about one half of Slot 2 at the repeater 140 and part of Slot 3. In an embodiment, the repeater 140 re-clocks the data signals received by shifting the data signals in time to align with (e.g., begin at) the next data slot. For example, the repeater 140 may re-clock the data signal 401 from Sensor 1 to start at the beginning of Slot 4 as data signal 401'. In so doing, the repeated data signals from Sensors 1-N/2 may be shifted by, for example, two data slots. The repeated data signals arrive at the gateway node 110 after a further transmission delay of $\Delta t_1$. The gateway node 110 differentiates the data blocks using the start bit at the beginning of each data block and the lull period that follows the end of a data block.

In addition to re-clocking (e.g., performing timing alignment) of data signals, the repeater 140 also regenerates (e.g., reconditions) the constituent bits of the data block as appropriate to compensate for any transmission degradation and noise due to the cable 120 and/or environmental factors. In so doing, the repeater 140 extends the range that the data signals can traverse while maintaining an acceptable bit error rate. According to an embodiment, the repeater 140 may also perform a parity check using the one or more parity bits of the data signal received.

Figure 4B:
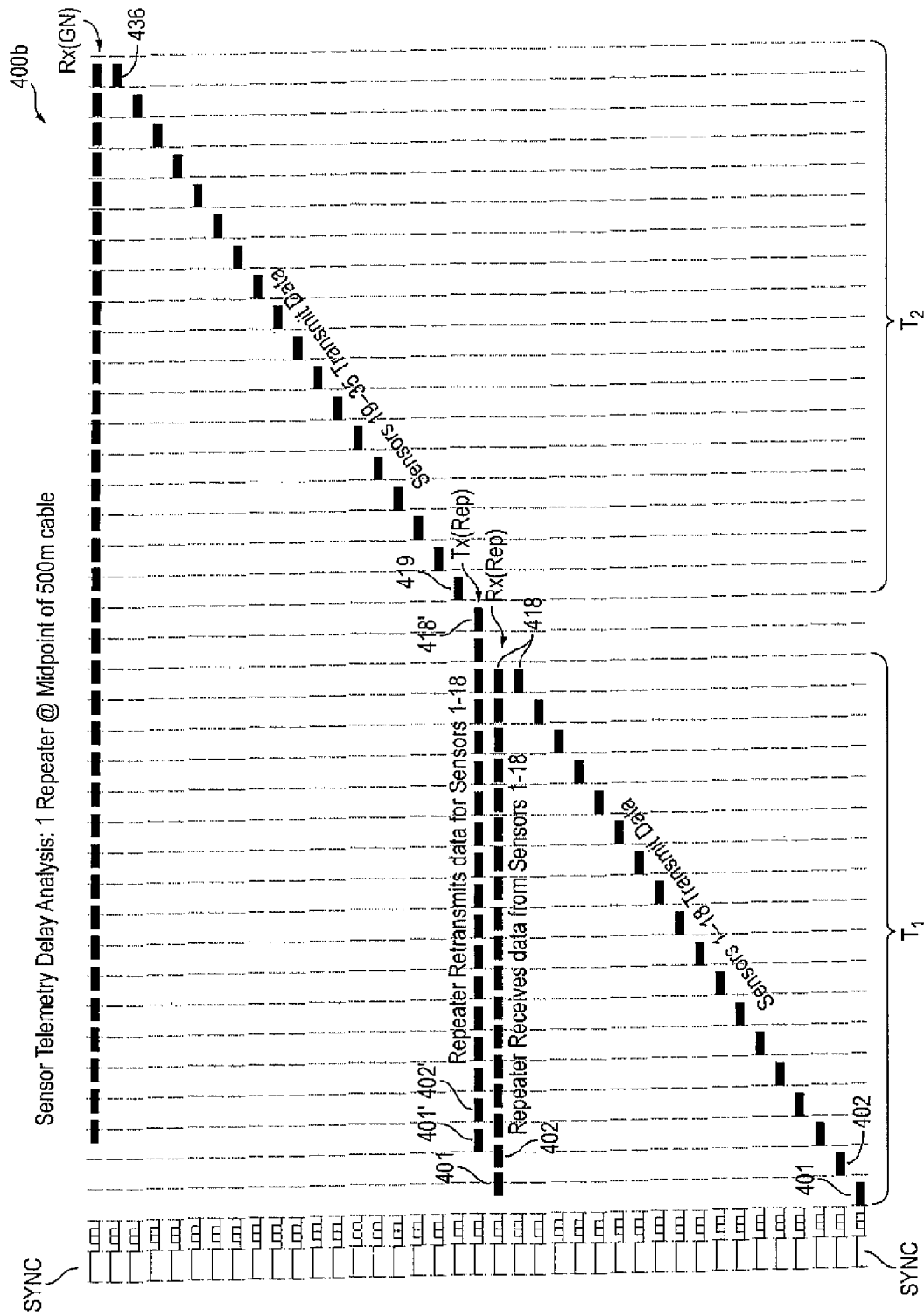
FIG. 4B illustrates a timing diagram of data blocks transmitted from sensors to the gateway node in a multi-sensor synchronous telemetry system, according to an embodiment of the present invention.

FIG. 4B illustrates a waveform diagram 400b of data blocks transmitted from sensors 130 to the gateway node 110 in a multi-sensor synchronous telemetry system 100, according to an embodiment of the present invention.

In the example illustrated in FIG. 4B, the synchronous telemetry system 100 includes 36 sensors 130 distributed at regular intervals along a 500 m long cable 120, and a repeater 140 located at the middle of the cable at about 250 m. The gateway node 110 transmits a synchronization signal having a number of frames, each marked by a SYNC pulse. The SYNC signal prompts Sensors 1-36 to nearly concurrently perform measurements of one or more environmental parameters. The repeater 140 passes the SYNC pulse through without re-clocking to preserve timing synchronization. Upon detecting the SYNC pulse, the Sensors 1-36 transmit data signals 411-446 corresponding to their measurements at predetermined times (e.g., at beginnings of successive data slots). For example, Sensors 1-18 may sequentially transmit data signals 401-418 during the first time block $T_1$, and Sensors 19-36 may sequentially transmit data signals 419-436 during the second time block $T_2$. Upon receiving each of the data signals 401-418 from Sensors 1-18, the repeater 140 repeats (e.g., resynchronizes) the received stream Rx(Rep) by re-clocking and regenerating (e.g., reconditioning) each of the data signals 401-418 to generate data signals 401'-418', which make up the transmit stream Tx(Rep). The transmit stream. Tx(Rep) may be shifted in time from the received stream Rx(Rep) by a period of time greater than a data slot and less than two data slots. The transmission time of Sensor 19 may be set (or configured) such that data signal 429 occupies the data slot immediately following that of the last data signal of the transmit stream Tx(Rep), that is, data signal 418'. Sensors 20-36 may sequentially transmit data signals 420-436, as show in FIG. 4B. After a period of time corresponding to a transmission delay of 250 m, the gateway node 110 receives the data signals 401'-418' and 419-436, which together form the received stream Rx(GN). The received stream Rx(GN) represents the uplink data signal as detected by the gateway node 110.

The gateway node 110 may be coupled to the processing unit for analyzing the sensor data from the received stream Rx(GN). The processing unit may further control the operation of the gateway node 110. A user may interact with the processing unit through a graphical user interface (GUI).

Figure 5:
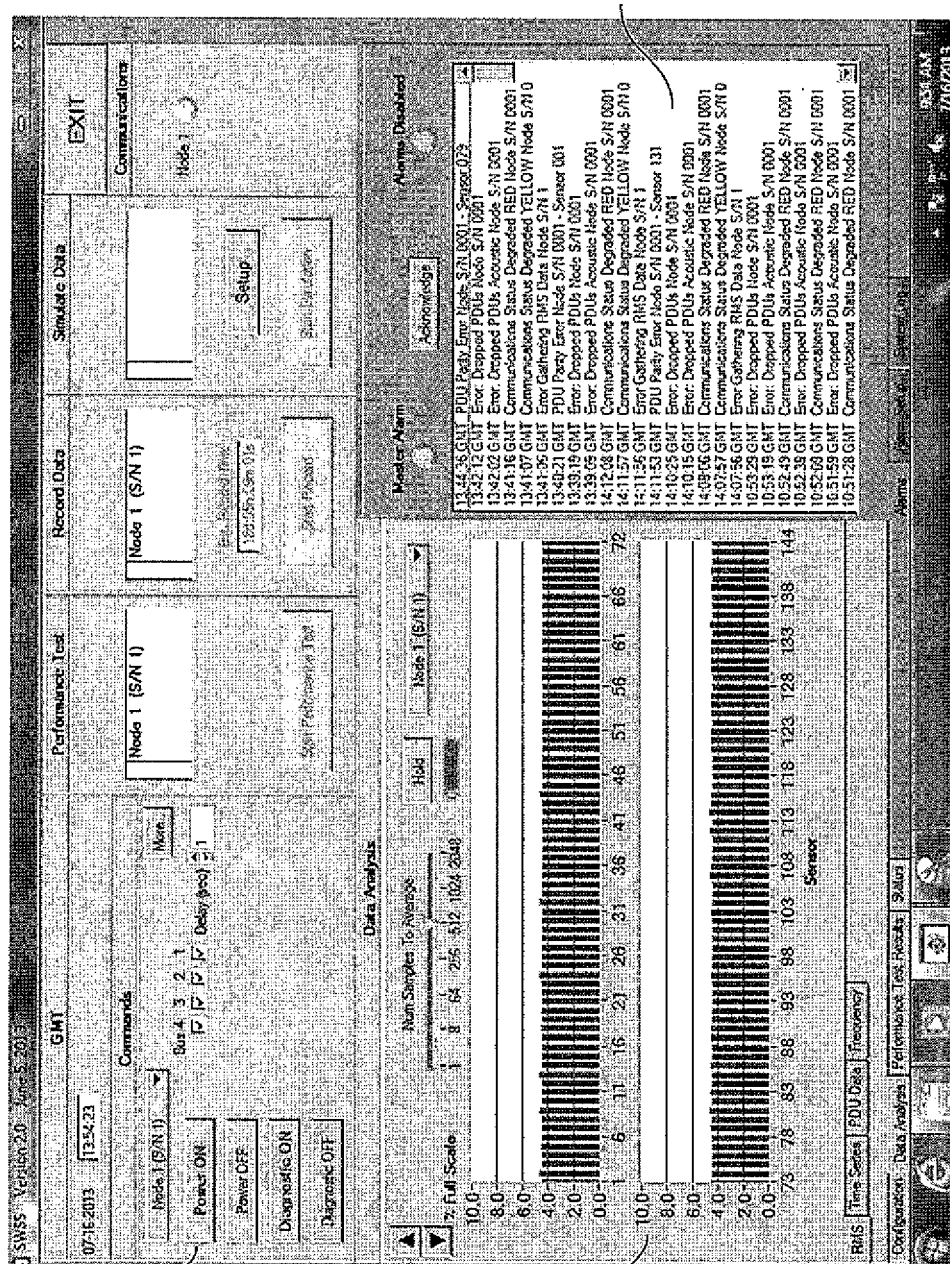
FIG. 5 illustrates a graphical user interface of the processing unit including control and monitoring panels, according to an illustrative embodiment of the present invention.

FIG. 5 illustrates a graphical user interface (GUI) 500 of the processing unit including control and monitoring panels, according to an embodiment of the present invention.

The GUI 500 may include a control panel 502 for controlling various aspects of the synchronous telemetry system 100, such as toggling the system power, operating in diagnostic mode, etc. The GUI may further include a monitor panel 504 for monitoring various aspects of the data received from the each of the sensors 130. In the example of FIG. 5, the monitor panel depicts the power levels of signals received from a synchronous telemetry system 100 having 144 sensors 130. An alarm panel 506 may provide a running tally of warnings or errors generated during the course of operation of the synchrohous telemetry system 100.

FIG. 6 is a block diagram of a process 600 of repeating signals received by the repeater 140, according to an embodiment of the present invention.

In block 602, the repeater 140 receives a synchronization signal at the first input-output port 201a of the repeater 140. The first transceiver 200a passes the synchronization signal to the synchronization controller 204, which locks into the periodicity and phase of the synchronization signal and generates a timing signal SYNC_GATE for controlling the timing operation of the internal components of the repeater 140.

In block 604, the repeater 140 passes the synchronization signal through to the second input-output port 201b of the repeater 140 for downlink transmission to one or more sensors 130. The repeater 140 (e.g., the pass-through gate 206) may pass through the synchronization signal without regenerating the signal.

In block 606, the repeater 140 receives a multiplexed data signal at the second input-output port 201b of the repeater 140. The second transceiver 200b passes the multiplexed data signal, which due to line delays may be out of sync with the synchronization signal, to the data regenerator 208 for resynchronization.

In block 608, the data regenerator 208 resynchronizes the multiplexed data signal to generate a resynchronized multiplexed data. The data generator 208 may utilize a number of shift registers to resynchronize the multiplexed data signal by re-clocking (e.g., delaying by an appropriate amount to align with a next time slot) and regenerating the data bits of the multiplexed data signal.

In block 610, the repeater 140 transmits the resynchronized multiplexed data signal through the first input-output port 201 a to the gateway node 110. In an example, the resynchronized multiplexed data signal may pass through one or more sensors 130 that may be coupled between repeater 140 and the gateway node 110.

The embodiments described herein have employed active-high signals, however as will be understood by a person of ordinary skill in the art, the embodiments of the present invention may also operate using active-low signals without departing from the spirit and scope of the present invention. For example, with suitable changes to their circuitry, the gateway node 110, sensors 130, and repeater 140 can operate based on signals that are the inverse of the signals shown in FIGS. 2B, 3A-3C, and 4A-4B.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of operation can be practiced without meaningfully departing from the principles, spirit, and scope of this invention, as set forth in the following claims and equivalents thereof.

What is claimed is:

1. A bidirectional repeater for repeating an electrical signal traversing a conductive line coupled between a gateway node and a sensor, the bidirectional repeater comprising:
   a first input-output port coupled to the gateway node;
   a second input-output port coupled to the sensor;
   a first transceiver configured to receive a synchronization signal of a plurality of synchronization signals from the first input-output port and to transmit a resynchronized data signal to the first input-output port;
   a second transceiver configured to transmit the synchronization signal to the second input-output port and to receive a data signal from the second input-output port; and
   a repeater circuit coupled to the first and second transceivers and configured to pass through the synchronization signal without re-clocking the synchronization signal, and to resynchronize the data signal to generate the resynchronized data signal,
   wherein an entirety of the resynchronized data signal occupies a time period between consecutive ones of the plurality of synchronization signals.

2. The bidirectional repeater of claim 1, wherein the repeater circuit comprises a timing control circuit that is configured to lock into a phase of the synchronization signal.

3. The bidirectional repeater of claim 1, wherein the repeater circuit is configured to resynchronize the data signal by re-clocking and regenerating the data signal.

4. The bidirectional repeater of claim 3, wherein re-clocking the data signal comprises shifting the data signal in time to start at a beginning of a next time slot.

5. The bidirectional repeater of claim 3, wherein the data signal comprises a serial, bidirectional, time division multiplexed data and is divided into a number of frames, each frame having a plurality of time slots.

6. The bidirectional repeater of claim 5, wherein a time slot of the plurality of time slots comprises a data bit.

7. The bidirectional repeater of claim 6, wherein regenerating the data signal comprises recreating the data bit to correct for noise and signal distortion.

8. The bidirectional repeater of claim 1, wherein the synchronization signal comprises a single pulse.

9. The bidirectional repeater of claim 1, wherein the repeater circuit is configured to pass through the synchronization signal without regenerating the synchronization signal.

10. The bidirectional repeater of claim 1, wherein the repeater circuit is further configured to lock into a phase of the synchronization signal.

11. The bidirectional repeater of claim 1, wherein the repeater is coupled to a plurality of sensors comprising the sensor, wherein the first input-output port is coupled to the gateway node through one or more sensors of the plurality of sensors.

12. A synchronous telemetry system comprising:
   a cable comprising one or more conductive elements for conducting a synchronization signal of a plurality of synchronization signals;
   a gateway node configured to supply the synchronization signal, and to receive a resynchronized data signal;
   a repeater coupled to the cable, and configured to pass through the synchronization signal without re-clocking the synchronization signal;
   a sensor coupled to the cable and configured to receive the synchronization signal, to measure a parameter in response to receiving the synchronization signal and to generate a data signal corresponding to the measured parameter; and
   wherein the repeater is coupled between the gateway node and the sensor, and is further configured to re-clock and reconstruct the data signal to generate the resynchronized data signal,
   wherein an entirety of the resynchronized data signal occupies a time period between consecutive ones of the plurality of synchronization signals.

13. The synchronous telemetry system of claim 12, wherein the one or more conductive elements comprise a pair of wires, and wherein the synchronization signal, the data signal, and the resynchronized data signal are differential signals transmitted over the pair of wires.

14. The synchronous telemetry system of claim 12, wherein the gateway node is further configured to supply electrical power to the sensor and repeater through the cable.

15. The synchronous telemetry system of claim 12, wherein the each of the sensor and repeater comprise a local power source.

16. The synchronous telemetry system of claim 12, wherein the synchronous telemetry system comprises a plurality of segments coupled in series, each segment comprising a plurality of sensors comprising the sensor and one or more repeaters comprising the repeater.

17. The synchronous telemetry system of claim 16, wherein the plurality of sensors concurrently measure parameters in response to receiving the synchronization signal.

18. The synchronous telemetry system of claim 12, wherein the sensor comprises at least one of an acoustic sensor, optical sensor, temperature sensor, and vibration sensor.

19. A method of repeating an electrical signal traversing a conductive line coupled between a gateway node and a sensor, the method comprising:

receive, by a repeater, a synchronization signal of a plurality of synchronization signals at a first input-output port of the repeater;

pass through, by the repeater, the synchronization signal, without re-clocking the synchronization signal, at a second input-output port of the repeater;

receive, by the repeater, a data signal at the second input-output port of the repeater;

resynchronize, by the repeater, the data signal to generate a resynchronized data signal; and transmit, by the repeater, the resynchronized data signal at the first input-output port of the repeater, wherein an entirety of the resynchronized data signal occupies a time period between consecutive ones of the plurality of synchronization signals.

20. The method of repeating an electrical signal according to claim 19, further comprising:

locking, by the repeater, into a phase of the synchronization signal.

* * * * *